(12) United States Patent
Grussmann et al.

(10) Patent No.: US 11,795,850 B2
(45) Date of Patent: Oct. 24, 2023

(54) HOLDER FOR AN ELECTRIC HEATING DISK IN AN EXHAUST GAS AFTERTREATMENT DEVICE

(71) Applicant: BENTELER AUTOMOBILTECHNIK GMBH, Paderborn (DE)

(72) Inventors: Elmar Grussmann, Altenbeken-Buke (DE); Ulrich Rusche, Werl (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 72 days.

(21) Appl. No.: 17/669,041

(22) Filed: Feb. 10, 2022

(65) Prior Publication Data

US 2022/0251991 A1 Aug. 11, 2022

(30) Foreign Application Priority Data

Feb. 11, 2021 (DE) ...................... 10 2021 103 283.0

(51) Int. Cl.
*F01N 3/20* (2006.01)
*B01D 53/94* (2006.01)
(Continued)

(52) U.S. Cl.
CPC ........... *F01N 3/2026* (2013.01); *B01D 53/94* (2013.01); *F01N 3/2842* (2013.01); *B01D 47/028* (2013.01); *B01D 2247/107* (2013.01); *F01N 3/027* (2013.01); *F01N 3/0275* (2013.01); *F01N 3/2006* (2013.01); *F01N 3/2013* (2013.01);
(Continued)

(58) Field of Classification Search
CPC combination set(s) only.
See application file for complete search history.

(56) References Cited

U.S. PATENT DOCUMENTS 4,548,625 A * 10/1985 Ishida ..................... F01N 3/027
60/303
4,723,973 A * 2/1988 Oyobe ..................... F01N 3/027
60/303
(Continued)

FOREIGN PATENT DOCUMENTS

CN 112343696 A 2/2021
DE 202020104976 U1 10/2020
(Continued)

OTHER PUBLICATIONS

Office Action for European Application No. 22155402.5 dated Dec. 21, 2022; 8pp.
(Continued)

*Primary Examiner* — Binh Q Tran
(74) *Attorney, Agent, or Firm* — HAUPTMAN HAM, LLP

(57) ABSTRACT

An exhaust gas treatment device for arranging in an exhaust gas section of a motor vehicle that includes a heating disk which is assigned to an exhaust gas aftertreatment component. The heating disk is configured by way of a flat heating element and a holder which is coupled to the former. The holder extends over the cross-sectional area of the heating element, and the holder itself is of disk-shaped configuration. The inner face of the heating disk is configured by way of arcuate spokes which are coupled irregularly to one another.

20 Claims, 6 Drawing Sheets

(51) Int. Cl.
*F01N 3/28* (2006.01)
*F01N 3/027* (2006.01)
*F01N 13/18* (2010.01)
*H05B 3/06* (2006.01)
*B01D 47/02* (2006.01)

(52) U.S. Cl.
CPC ...... *F01N 13/1872* (2013.01); *F01N 2240/04* (2013.01); *F01N 2240/05* (2013.01); *F01N 2240/16* (2013.01); *F01N 2550/22* (2013.01); *F01N 2610/10* (2013.01); *F01N 2900/0602* (2013.01); *F01N 2900/1631* (2013.01); *H05B 3/06* (2013.01); *H05B 2203/022* (2013.01)

(56) References Cited

U.S. PATENT DOCUMENTS

| | | | |
|---|---|---|---|
| 5,614,155 | A | 3/1997 | Abe et al. |
| 5,953,909 | A * | 9/1999 | Waltrip, III ............... F01N 3/26 60/275 |
| 11,578,632 | B2 * | 2/2023 | Hoeckel .................... F01N 3/28 |
| 2012/0097659 | A1 | 4/2012 | Duesterdiek et al. |
| 2018/0291787 | A1 * | 10/2018 | Bartolo ................. F01N 3/2882 |
| 2019/0316507 | A1 * | 10/2019 | Ottaviani ............... B01D 53/94 |
| 2020/0309006 | A1 * | 10/2020 | Gidney ................ F01N 3/2066 |
| 2022/0074333 | A1 | 3/2022 | Hoeckel et al. |
| 2022/0205380 | A1 * | 6/2022 | Nerheim ............... F01N 3/006 |

FOREIGN PATENT DOCUMENTS

| | | |
|---|---|---|
| DE | 102019121382 A1 | 2/2021 |
| EP | 3964696 A1 | 3/2022 |
| JP | S6078918 U | 6/1985 |
| JP | H084521 A | 1/1996 |
| JP | H08326526 A | 12/1996 |
| JP | 2009043470 A | 2/2009 |
| JP | 2019157670 A | 9/2019 |
| JP | 2022045351 A | 3/2022 |
| WO | 2010122005 A1 | 10/2010 |

OTHER PUBLICATIONS

Office Action for Japanese Application No. 2022-002666 dated Feb. 14, 2023; 6pp.
Extended European Search Report for European Application No. 22155402.5 dated Jul. 22, 2022; 13pp.
Office Action for German Application No. 10 2021 103 283.0 dated Sep. 30, 2021; 10pp.

* cited by examiner

HOLDER FOR AN ELECTRIC HEATING DISK IN AN EXHAUST GAS AFTERTREATMENT DEVICE

RELATED APPLICATIONS

The present application claims priority of German Application Number 10 2021 103 283.0 filed Feb. 11, 2021, the disclosure of which is hereby incorporated by reference herein in its entirety.

FIELD

The present disclosure relates to an exhaust gas treatment device in an exhaust gas section of a motor vehicle.

BACKGROUND

In order to comply with legislation and marketplace and/or customer expectations, internal combustion engines are nowadays tuned to the highest efficiency and thus produce as little waste heat as possible.

This conflicts with rapid heating of the exhaust gas components after cold starting and maintaining of this temperature range during the common test cycles, in order to ensure optimum reaction conditions for the conversion of noxious exhaust gas constituent parts into innoxious elements.

This light-off begins from approximately 180° C. in the case of catalytic converters, and the reaction speed increases with the temperature. Since upcoming registration restrictions evaluate the exhaust gas composition directly after cold starting, the light-off temperature should be reached as rapidly as possible.

To this end, heating elements are used which permit active thermal management of the exhaust gas system within certain limits. They are currently usually wound spirally from thin plate honeycomb structures (fin structures). The separation of the conductors (honeycomb sections) is ensured by way of an air gap. The entire construction is reinforced by way of high temperature soldering. The electrical insulation of the entire heating matrix usually takes place via ceramic pins (support pins), the latter being pushed into the catalytic converter body.

SUMMARY

An object of the present disclosure is to arrange a heating device in an exhaust gas section, which heating device is able to be produced inexpensively and simply, at the same time provides a highly efficient heat output and has high thermal resistance.

According to the disclosure, the abovementioned object is achieved by way of an exhaust gas treatment device for arranging in an exhaust gas section of a motor vehicle.

The present disclosure relates to an exhaust gas treatment device for arranging in an exhaust gas section of a motor vehicle. Said motor vehicle comprises an internal combustion engine. The internal combustion engine is able to be, for example, a diesel or gasoline engine, or a hybrid motor vehicle which comprises an additional internal combustion engine. The exhaust gas treatment device is therefore an exhaust gas aftertreatment device.

The motor vehicle comprises an exhaust gas section. An exhaust gas aftertreatment component in the form of a catalytic converter, is arranged in the exhaust gas section. A heating disk is arranged upstream or downstream of the catalytic converter in the exhaust gas flow direction in the exhaust gas section. The heating disk serves for electric external heating of the catalytic converter, for example during the cold starting phase.

The heating disk itself is configured by way of a flat heating element. This is able to be a heating coil or else a honeycomb arrangement. The heating element is an electric resistance heater which heats up in a very short time when loaded with an electrical current and then heats the catalytic converter via radiation and/or convection. The heating element or the heating disk is able to be produced from a perforated plate or a wire fabric or wire mesh. The heating disk itself does not have to be configured as a single-piece flat body, but is able to also be a spirally wound heating conductor which is then arranged, however, in the plane of a disk. The heating conductor itself is then either of solid configuration or also is able to be configured from a porous material, for example from a wire mesh. The wire mesh is a wire fabric or a perforated plate. This affords the advantage, furthermore, that the heating element not only is able to be flowed around, but also is able to be flowed through as a result of the respective porosity of the heating conductor.

In order that the electric heating element is arranged in the exhaust gas section, a holder is provided according to the disclosure. The electric heating element is coupled to the holder. The holder extends at least over the cross-sectional area of the heating element.

The holder is of greater configuration in a radially peripheral manner than the heating element itself. The holder is able to be arranged in a housing of the exhaust gas aftertreatment device and is able to be coupled to an inner shell face. The holder then holds the heating element spaced apart from the inner shell face of the housing, in relation to the radial direction.

In order that the holder is able to hold the heating element itself in an axially spaced-apart manner, the holder itself is configured as a disk-shaped, flat element. In order, however, that the exhaust gas is able to flow through the holder, the holder itself is not configured as a sealed disk, but rather has a structure in the manner of a spider's web or lattice. According to the disclosure, said structure is configured by virtue of the fact that the inner face (in relation to the radial direction) of the holder or the disk shape of the holder is configured by way of arcuately running spokes which are coupled to one another. Here, said arcuate spokes follow a spline function or have a curved course. The arc shape of the individual spokes brings about the thermomechanical strength of the holder. Consequently, expansions or contractions on account of different temperature ranges are compensated for as satisfactorily as possible on account of the arcuate shape.

The heating disk is then coupled to the holder via individual coupling points or holding points. As a result of the satisfactory thermomechanical strength, the fastening points therefore experience only a small positional change on account of expansions or contractions, which in turn also has an effect on the thermomechanical strength of the heating element which is coupled to the holder.

Within the context of the disclosure, a spoke does not have to run from an outer peripheral frame or contour radially inward to a hub. Within the context of the disclosure, a spoke is a connection which runs into the inner region. A radial inwardly running orientation does not mean running rectilinearly inward, but rather that the spoke generally has an orientation with respect to a radially directed interior space of the disk-shaped body.

Therefore, the spokes connect to form a substantially irregular supporting lattice, and therefore connecting points are able to be provided over the entire cross-sectional area of the heating conductor. At the same time, the flow resistance is extremely low, since the spokes cover less than 20%, less than 15% and less than 10% of the cross-sectional area in relation to the entire cross section of the housing of the exhaust gas aftertreatment component. There are large cut-out areas in the holder, with the result that the exhaust gas is able to flow through the holder and the heating element with a flow resistance which is increased to a virtually negligible extent. The intermediate regions between the spokes are therefore configured or cut out to be open to flow.

The holder is able to be produced, for example, as a punched part or else as a cutout component by way of a laser cutting method or the like from a metallic material, for example, from a stainless steel material which is resistant to exhaust gas; for example, a ferritic or austenitic material is used here.

In each case two adjacent spokes run in opposite directions with respect to one another, in relation to the arcuate shape. This is able to improve the thermal resistance on account of different expansion behaviors.

In order that the heating element is then coupled to the holder, spacer elements are provided. These are ceramic sleeves. The ceramic sleeves have the advantage that they are of thermally resistant and electrically non-conducting configuration. A pin is then coupled to the holder and the heating element in a manner which engages through the ceramic sleeves. In this way, the heating element is arranged in a positively locking positionally fixed manner by the holder in an axially spaced-apart manner, and is at the same time also insulated electrically. In the case of the heating element being loaded with an electrical current, a short circuit therefore does not occur with the housing of the exhaust gas aftertreatment component.

In at least one embodiment, the pins which are able to be called fastening pins are arranged under a prestress. The prestress is achieved by the pins being spot welded. An ambient temperature that a high thermal action takes place during the welding operation and the pins are welded in a positively locking manner. When the pin then cools, the pin contracts and therefore prestresses the holder and the heating disk, coupled via the ceramic spacer sleeve. A loose seat, rattling or else thermal stressing or expansions are therefore avoided reliably.

The abovementioned effect is able to be improved by virtue of the fact that two fastening pins are inserted from opposite sides, that is to say in a manner which is directed toward one another. Said pins are then coupled to one another, for example, welded, at the tips which make contact. Excess material melts, and the axial length of the two resulting pins then corresponds at the end of the welding operation to the spacing of the heating disk, the spacer sleeve and the holder. A fit is produced. The material contracts after the welding operation, with the result that the two pins which are coupled to one another contract in their axial direction and therefore couple the heating disk to the holder via the spacer element in the form of the ceramic sleeve, the pins being under a prestress or tensile stress. In the case of subsequent heating during operation, that is to say when exhaust gas flows, an expansion of the pins therefore does not lead to rattling or loose holding on account of the prestress. The service life of the holder is therefore increased.

The spokes themselves are configured in one piece and from the same material in the holder.

The holder itself is able to be configured in multiple layers in at least one embodiment. There are then three sheet metal layers here. Two outer sheet metal layers are configured as a respective clamping plate or holder plate. A middle sheet metal layer is configured as a spacer plate. A respective ceramic sleeve is able to be inserted with a collar into an opening of the spacer plate. A clamping plate which is connected upstream in the axial direction then fixes the collar of the spacer sleeve in the holder itself. The individual layers are able to be coupled to one another in an integrally joined manner, for example by way of a soldering operation or else a welding operation.

In at least one embodiment, the heating element is arranged in a sandwich-like manner between two holders, in relation to the exhaust gas flow direction. This means that one holder is connected upstream of the heating element in the exhaust gas flow direction, and a further holder is connected downstream of the heating element in the exhaust gas flow direction. In relation to the axial direction, the heating element is therefore held in an optimum manner, even in the case of high flow speeds of the exhaust gas which flows through the exhaust gas aftertreatment component.

BRIEF DESCRIPTION OF THE DRAWINGS

Further advantages, features and properties of the present disclosure are the subject matter of the following description. Advantageous design variants are shown in diagrammatic figures which serve for simple comprehension of the disclosure.

DETAILED DESCRIPTION

Figure 1:
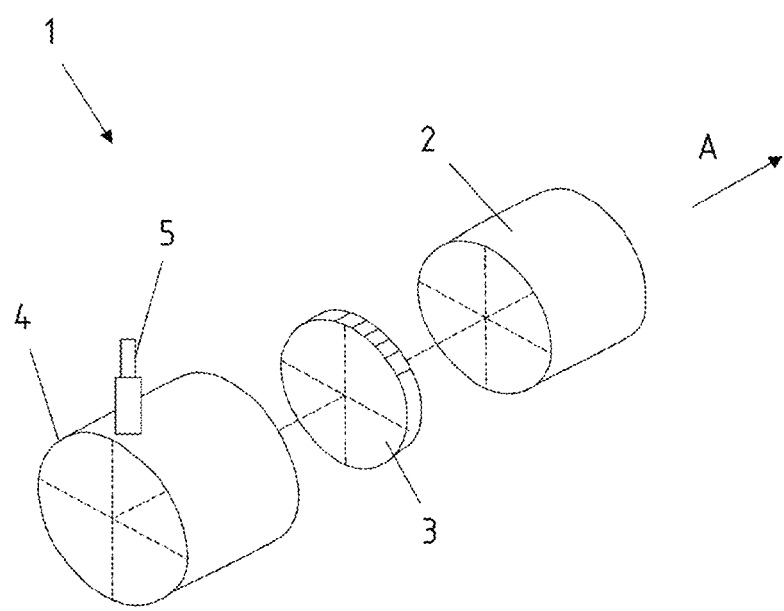
FIG. 1 shows an exploded illustration of an exhaust gas treatment device according to the disclosure.

FIG. 1 shows an exhaust gas treatment device 1 according to the disclosure for arranging in an exhaust gas section of a motor vehicle. To this end, a catalytic converter 2 with a heating disk 3 which is positioned upstream in the exhaust gas flow direction A is arranged in a housing 4. There are able to be electrical connectors 5 on the housing 4, with the result that the heating disk 3 which is arranged in the housing 4 are able to be loaded with current.

Figure 2:
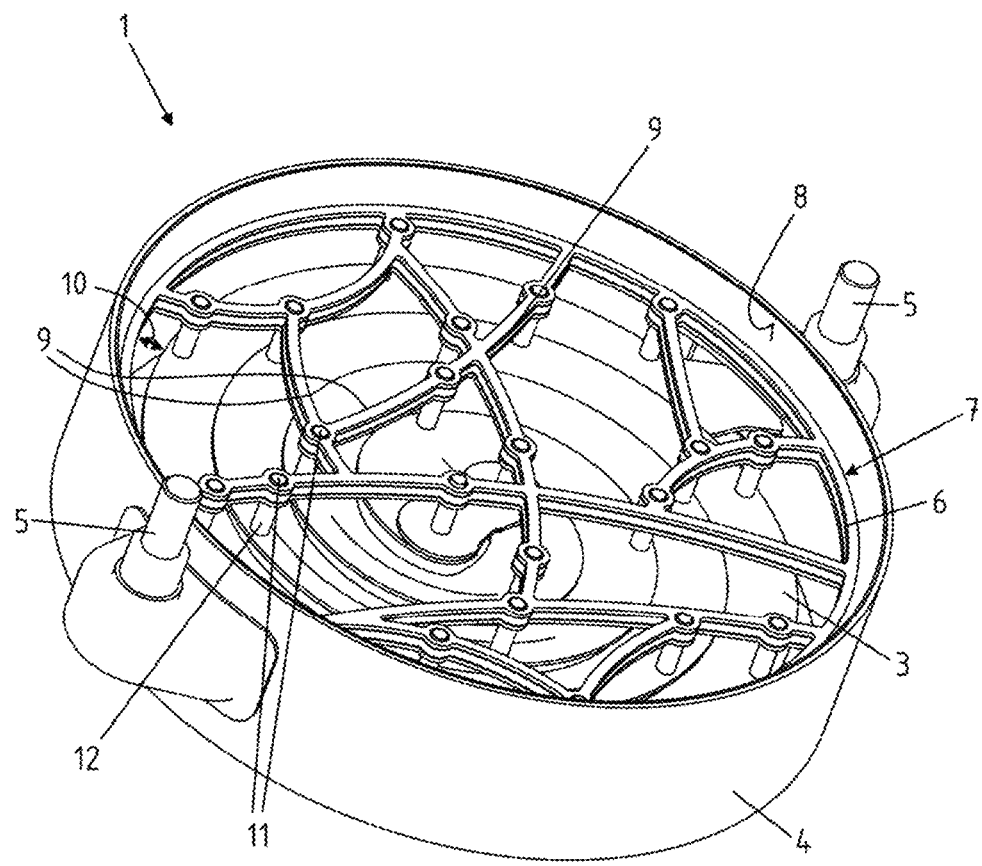
FIG. 2 shows a perspective view of a holder according to the disclosure with a heating disk.
Figure 3:
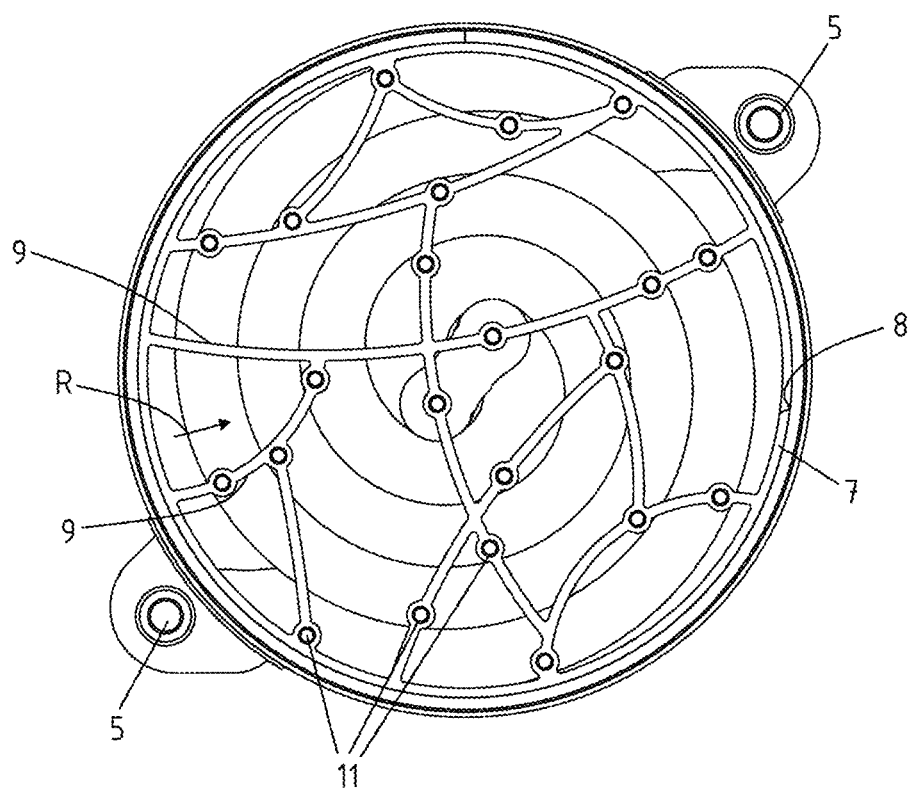
FIG. 3 shows a top view or end view of a holder according to the disclosure with a heating disk which lies behind the holder.

FIG. 2 and FIG. 3 show a perspective view and an end view of the heating disk 3 in the housing 4. A holder 6 according to the disclosure is mounted upstream of the heating disk 3 in the exhaust gas flow direction A.

The holder 6 is itself of disk-shaped configuration with a lattice-like structure. An outer peripheral frame or an outer peripheral contour 7 of the holder 6 is coupled to an inner shell face 8 of the housing 4. This is able to take place, for example, via soldering or welding. Individual spokes 9 which configure a lattice-like structure then extend inward in relation to the radial direction R from the outer peripheral contour 7 or ring. The spokes 9 themselves run in each case in a curved or arcuate manner. The spokes 9 are distributed irregularly with respect to one another in this design variant. In each case two adjacent or adjoining spokes 9 run in opposite directions.

The cross-sectional area of the holder 6 therefore substantially covers the cross-sectional area of the inner shell face 8 of the housing 4. Cutouts are provided, however, between the spokes 9 and the lattice-like structure of the holder 6, with the result that more than 80%, more than 85%, more than 90% and more than 95% of the cross-sectional area is provided for throughflow of the exhaust gas. Consequently, the holder 6 has a negligible effect on the flow resistance of the exhaust gas which flows through the exhaust gas treatment device 1.

The heating disk 3 is at a corresponding spacing 10 from the inner shell face 8 of the housing 4. The thermal expansion of the heating disk 3 therefore does not lead to the heating disk 3 coming into contact with the housing 4 in the radial direction R, with the result that an electrical short circuit would occur.

Fastening points 11 are then arranged on the individual spokes 9. Said fastening points 11 have a spacer element 12 which is, for example, a ceramic sleeve. The heating disk 3 is then coupled to the holder 6 itself via the spacer element 12. Three fastening points 11 are configured on a spoke 9. Therefore, an optimum compensation relationship of a given holding function and compensation of the thermal expansion is able to be achieved over the entire course of the spoke 9 and with checking of the thermal expansion.

Figure 4:
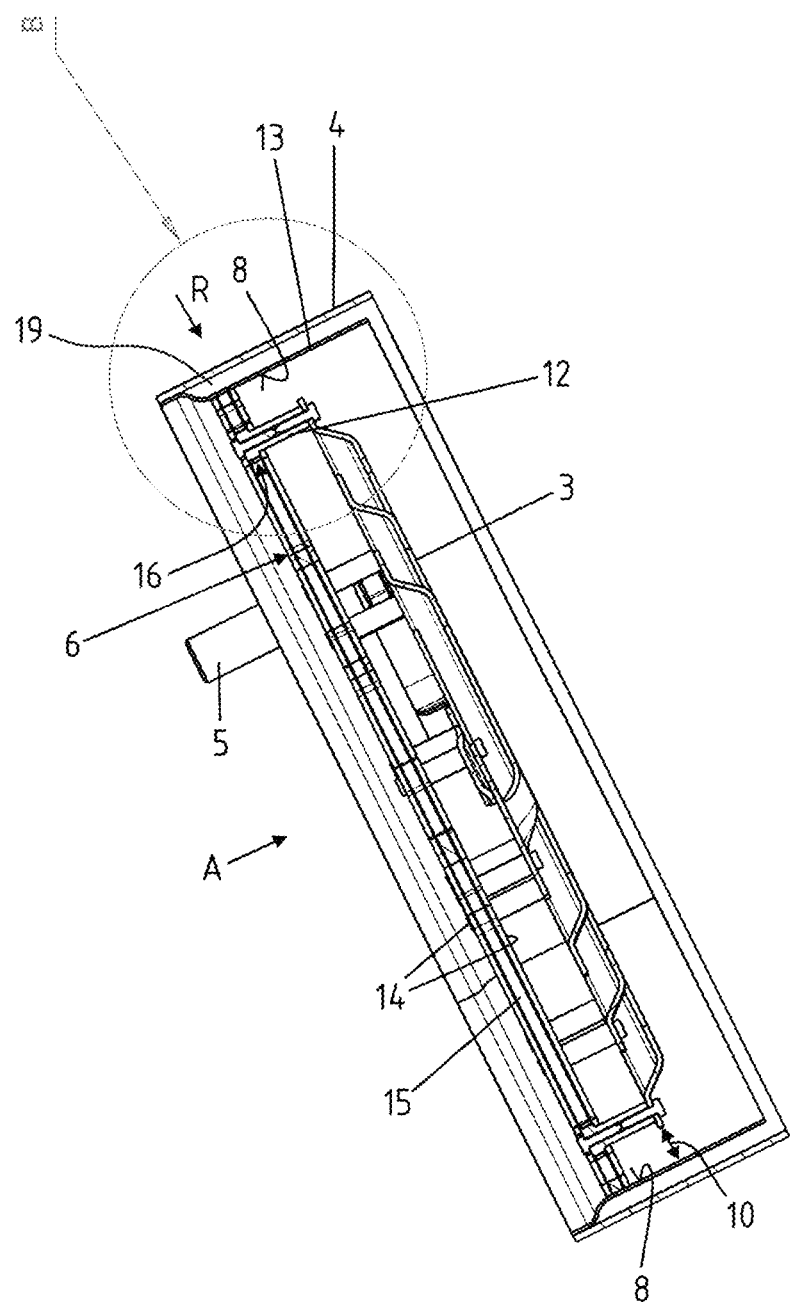
FIG. 4 shows a sectional view of FIG. 3 according to the disclosure.
Figure 5:
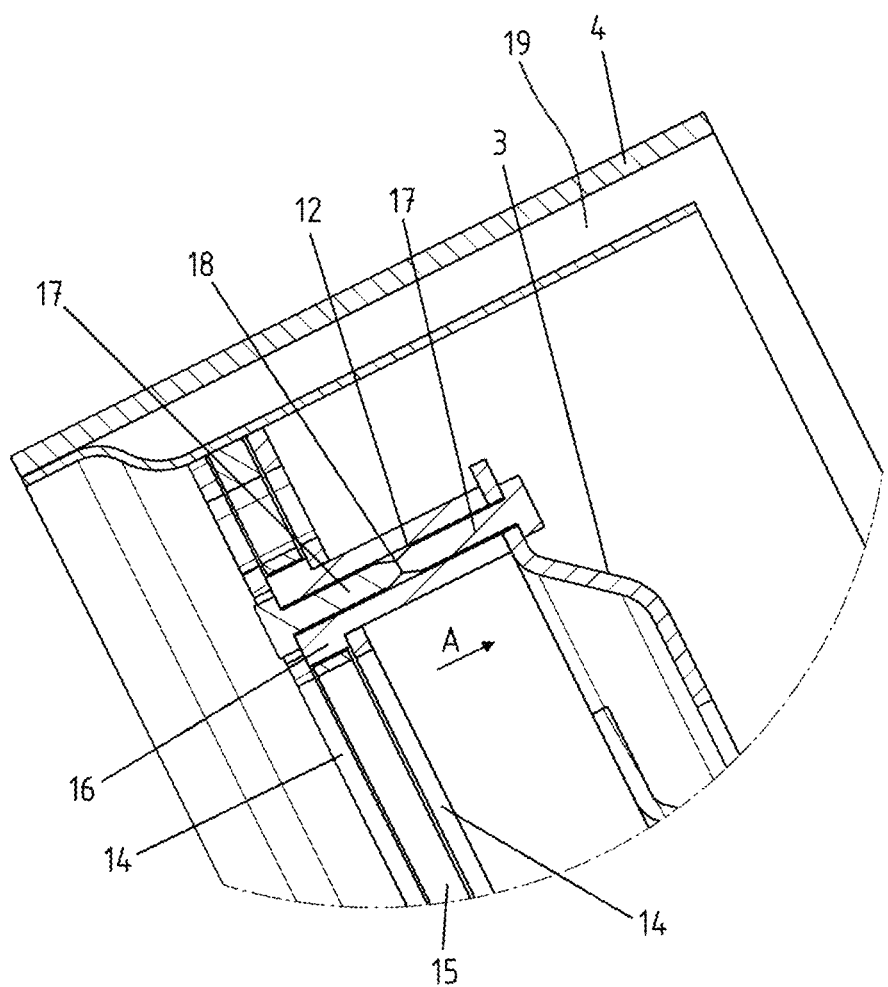
FIG. 5 shows a detailed view of FIG. 4 according to the disclosure.

FIG. 4 shows a longitudinal sectional view according to FIG. 3, which shows that an insert plate 13 is arranged in the housing 4 itself, which insert plate 13 is spaced apart in the radial direction R from the actual inner shell face 8 of the housing 4. Therefore, in this case, the holder 6 is coupled to the inner shell face 8 of the insert plate 13. This results in an air gap 19 for thermal insulation. The insert plate 13 is configured as a sleeve. FIG. 4 shows that the holder 6 itself is configured in three layers and has two holder plates 14 which lie on the outside in the axial direction and a spacer plate 15 which lies in the middle. The following effect according to the disclosure is achieved as a result. The spacer elements 12 in the form of ceramic sleeves comprise a collar 16 which lies at the top. The collar 16 is arranged in a corresponding opening of the spacer plate 15 and is then positionally fixed in a positively locking manner by way of a holding plate mounted upstream and downstream in the exhaust gas flow direction A. In this way, the respective spacer element 12 or the respective ceramic sleeve is positionally fixed in a positively locking manner on the holder 6. The individual layers are able to be coupled among one another in an integrally joined manner. This once again becomes clear in the enlarged view according to FIG. 5. The heating disk 3 is then placed with a fastening pin 17 or a bolt in a positively locking manner onto an axial end of a spacer element 12 and is positionally fixed in a positively locking manner via the fastening pin 17. Here, fastening pins 17 are inserted from two sides, which fastening pins 17 are coupled to one another at a middle coupling point 18, for example by way of resistance spot welding. The fastening pin 16 on the side of the holder 6 has bearing contact exclusively against the spacer element 12 which is electrically insulated. Therefore, no current-conducting connection from the heating disk 3 to the spacer element 12 is brought about.

Figure 6:
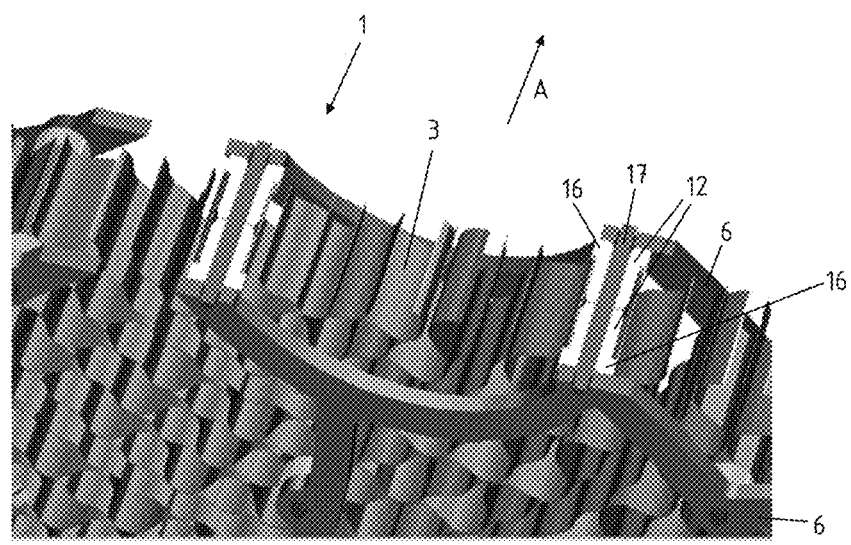
FIG. 6 shows an alternative design variant of a heating disk which is arranged between two holders in the exhaust gas flow direction according to the disclosure.

FIG. 6 shows a sectional view through a further design variant. Here, a holder 6 is connected upstream of the heating disk 3 in the exhaust gas flow direction 1, and a further holder 6 is connected downstream of the heating disk. The heating disk 3 itself is configured by way of plate layers of corrugated configuration. This therefore results in a honeycomb-like structure in a top view or in a view along the exhaust gas flow. Said honeycomb-shaped structure is also configured with strength in the radial direction R as a result of the holders 6 which are mounted upstream and downstream. Spacer elements 12 are then in turn arranged between the holders 6. The heating disk 3 is then arranged at a respective axial spacing 10 on the spacer elements 12 themselves. A fastening pin 17 engages through the spacer elements 12 and couples the opposite holders 6 in a positively locking manner. The fastening pin 17 is able to be in each case, for example, spot welded or soldered to the holders 6. The spacer elements 12 in each case comprise a collar 16, with the result that the heating disk 3 is positionally fixed in a positively locking manner between the collars 16 and is therefore arranged in the exhaust gas treatment device in a manner which is electrically insulated from the holders 6.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. An exhaust gas treatment device in an exhaust gas section of a vehicle, comprising:
   a heating disk configured to heat an exhaust gas aftertreatment component, wherein
   the heating disk comprises a heating element, and a holder coupled to the heating element,
   the holder extends over a cross-sectional area of the heating element,
   the holder is disk-shaped,
   the holder comprises a lattice-like structure, and
   the lattice-like structure comprises a plurality of arcuate spokes coupled irregularly together.

2. The exhaust gas treatment device according to claim 1, wherein the holder comprises a metallic material.

3. The exhaust gas treatment device according to claim 1, wherein two adjacent spokes among the plurality of spokes have opposed arcuate shapes.

4. The exhaust gas treatment device according to claim 1, wherein each spoke of the plurality of spokes comprises at least one fastening point coupled to the heating element.

5. The exhaust gas treatment device according to claim 1, wherein the heating element is an electric heating element and comprises a honeycomb-like structure.

6. The exhaust gas treatment device according to claim 1, wherein the heating element comprises a corrugated foil material.

7. The exhaust gas treatment device according to claim 1, further comprising a spacer sleeve arranged between the heating element and the holder.

8. The exhaust gas treatment device according to claim 1, wherein the holder comprises two holders, which sandwich the heating element therebetween.

9. The exhaust gas treatment device according to claim 7, further comprising a pin, wherein the pin engages through the spacer sleeve and couples the holder to the heating element.

10. The exhaust gas treatment device according to claim 9, wherein the pin comprises two pins in the spacer sleeve, the two pins point toward one another in opposite directions, each of the two pins having a tip by which the two pins are coupled together.

11. The exhaust gas treatment device according to claim 1, wherein the holder comprises a peripheral portion configured to be coupled to a housing of the exhaust gas aftertreatment component, and the plurality of spokes are integrally connected to the peripheral portion and protrude inwardly in a radial direction from the peripheral portion.

12. The exhaust gas treatment device according to claim 1, wherein the exhaust gas aftertreatment component is a catalytic converter.

13. The exhaust gas treatment device according to claim 1, wherein the holder comprises a punched-out part or a cut-out part.

14. The exhaust gas treatment device according to claim 1, wherein each spoke of the plurality of spokes comprises at least two fastening points for coupling to the heating element.

15. The exhaust gas treatment device according to claim 1, wherein at least one spoke of the plurality of spokes comprises three or more fastening points for coupling to the heating element.

16. The exhaust gas treatment device according to claim 1, wherein the heating element comprises a perforated plate or wire mesh, the perforated plate or wire mesh being wound spirally.

17. The exhaust gas treatment device according to claim 7, wherein the spacer sleeve is ceramic.

18. The exhaust gas treatment device according to claim 7, wherein the spacer sleeve comprises a material that is electrically insulating and thermally resistant.

19. The exhaust gas treatment device according to claim 1, wherein the heating element is flat.

20. The exhaust gas treatment device according to claim 9, wherein the two pins are under tensile stress.

* * * * *